(12) United States Patent
Koutmos et al.

(10) Patent No.: US 12,014,403 B2
(45) Date of Patent: Jun. 18, 2024

(54) SOFTWARE MANAGEMENT SYSTEM

(71) Applicants: Yanni Koutmos, Torrington, CT (US); Alexander Koutmos, Torrington, CT (US)

(72) Inventors: Yanni Koutmos, Torrington, CT (US); Alexander Koutmos, Torrington, CT (US)

( * ) Notice: Subject to any disclaimer, the term of this patent is extended or adjusted under 35 U.S.C. 154(b) by 233 days.

(21) Appl. No.: 17/522,235

(22) Filed: Nov. 9, 2021

(65) Prior Publication Data

US 2023/0142903 A1    May 11, 2023

(51) Int. Cl.
  *G06Q 30/00*    (2023.01)
  *G06K 7/14*     (2006.01)
  *G06Q 10/20*    (2023.01)
  *G06Q 30/04*    (2012.01)

(52) U.S. Cl.
  CPC ........... *G06Q 30/04* (2013.01); *G06K 7/1417* (2013.01); *G06Q 10/20* (2013.01)

(58) Field of Classification Search
  CPC ....... G06Q 30/04; G06Q 10/20; G06K 7/1417
  See application file for complete search history.

(56) References Cited

U.S. PATENT DOCUMENTS

| | | | |
|---|---|---|---|
| 6,199,048 B1 | 3/2001 | Hudetz | |
| 8,086,337 B1 * | 12/2011 | Green | G06Q 10/06313 |
| | | | 705/28 |
| 8,131,597 B2 | 3/2012 | Hudetz | |
| 8,540,159 B2 | 9/2013 | Lee | |
| 2015/0066782 A1 | 3/2015 | Vainberg et al. | |
| 2021/0272037 A1 * | 9/2021 | Hanebeck | G06Q 10/08 |

OTHER PUBLICATIONS

Tim By RSG, RSG.

* cited by examiner

*Primary Examiner* — Rokib Masud
(74) *Attorney, Agent, or Firm* — IP Attorneys Group, LLC

(57) ABSTRACT

A management system, which involves a computer and software executing on that computer, that tracks the usage of materials used in a repair and collates that information into an accurate material invoice. This system produces significantly more accurate invoices while also having a very user-friendly interface that can be easily accessed with any image recognition device, including smart phones. More specifically, the system involves scanning repair order QR code tags and material QR code tags to create detailed invoices for repair orders that have the exact amount of materials used on the repair orders. This system also allows administrators to track the amount of materials used on a repair order and will automatically flag the available stock of materials if they fall below a configured threshold. If the available stock falls below the configured threshold, then suppliers will automatically be notified by the system to restock the material.

18 Claims, 7 Drawing Sheets

SOFTWARE MANAGEMENT SYSTEM

FIELD OF THE INVENTION

The invention relates to a system for managing and tracking repairs performed in an auto body shop and the materials used in those repairs.

BACKGROUND OF THE INVENTION

Currently, in the typical auto body shop, the cost of materials are calculated as a function of hours on an estimate. They are generally not based on an itemized counting of the actual materials used in a given repair. This is because it is usually difficult to obtain an accurate itemizing counting of the materials used in a repair. This is normally a difficult task considering technicians have to track the inventory of physical materials used, the volume of materials used, the percent of material used, the time a material is used, the length of the material used, and the mass of a material used. The plethora of different types of materials, the numerous technicians working in an auto body shop, and the time crunch that most technicians face can all potentially add to the difficulty of this very particular task. Tracking everything appropriately typically requires each and every technician to meticulously count and measure every item they use on a repair and then manually add the total materials used together to create an invoice for the repair. The time and labor required for each and every technician to calculate the materials and collaborate with other technicians to create an accurate itemized counting is typically too significant to be worth the effort for most auto body shops to deal with. As a result, many auto body shops simply default to calculating the cost of materials as a function of hours to avoid the hassle of tracking materials.

Tracking everything appropriately may even require hiring additional support staff to do this work for the technicians. This option could have its own problems though because it may prove to be difficult for the additional support staff to know how much of a given material is used when they are not the ones using the material in the repairs.

Additionally, as a result of being unable to create an accurate invoice for the materials used in a repair, auto body shops cannot receive proper reimbursement from insurance companies. Because of this, many auto body shops see deficits on the materials they use in a repair.

In light of these difficulties when operating an auto body shop, a new solution for tracking and managing all the materials used on a repair is required. What is desired then is an invention that tracks and manages all the materials used on a repair including the inventory of physical materials used, the volume of materials used, the percent of material used, the time a material is used, the length of the material used, and the mass of a material used and collates that data into a form that will automatically create an accurate material invoice for a given repair. Additionally, allowing this solution to be performed via a technician's smart phone device would improve the workflow of the entire auto body shop.

SUMMARY OF THE INVENTION

It is therefore an object of the invention to provide a system that tracks the usage of materials for a repair in a user-friendly and accurate manner.

Another object of the invention is to track the usage of different types of materials so inventory can be calculated effectively. Not all types of materials can be measured in physical units, i.e., 10 bolts. Therefore, the invention will track not only physical units, but also percent of material used, the volume of material used, the amount of time that a material is used, the length of a material used, and the mass of a material used, among other types of usage.

A further object of the invention is to create repair orders that several technicians can add to at the same time, allowing for a more fluid workflow on a repair order. Instead of a technician having to wait to add the materials they utilized to a singular device shared by multiple technicians, they can simply pull out their image recognition device, such as their smart phone, scan a repair order QR code tag, scan the material QR code tag, enter in the details related to the material they used, and then proceed to their next task. This will effectively eliminate the wait times that would be accrued if each technician had to enter the details of the material that they used onto one, shared device in an auto body shop.

An additional object of the invention is to create material QR code tags so that every material used on a repair order can be tracked accurately. If a new material is added to the inventory, all of the relevant details associated with the material will be associated with the material on the material QR code tag. Instead of having to manually enter in the specific material details for every single repair that uses a particular material, a technician will only have to scan the material QR code tag once with their image recognition device. By simply scanning the material QR code tag, all of the relevant information will be sent to the repair order and the technician will simply have to report how much of the material they used on a particular job. This will allow the technician to focus more on the repair order job at hand and less on the administrative tasks in tracking the materials. By doing this, the workflow of all technicians on a repair order will be significantly increased.

A further object of the invention is to accurately track the time spent working on a given repair order. When a technician scans a repair order QR code tag, a timer will automatically begin tracking the time a technician spends on the repair. When that technician either switches to a new repair order or ends their interactions with the original repair order, then that timer will stop accruing time to the repair order. Additionally, if there are two or more technicians working on a given repair order, the timer will keep track of each amount of time that they spend on the repair order separately, as well as the total amount of time that all technicians spend on the repair order.

BRIEF DESCRIPTION OF THE DRAWINGS

So that the manner in which the above recited features can be understood in detail, a more particular description of the invention, briefly summarized above, may be had by reference to embodiments some of which are illustrated in the appended drawings. It is to be noted, however, that the appended drawings illustrate only typical embodiments and are therefore not to be considered limiting of its scope, for the invention may admit to other equally effective embodiments.

DETAILED DESCRIPTION OF THE INVENTION

Figure 1:
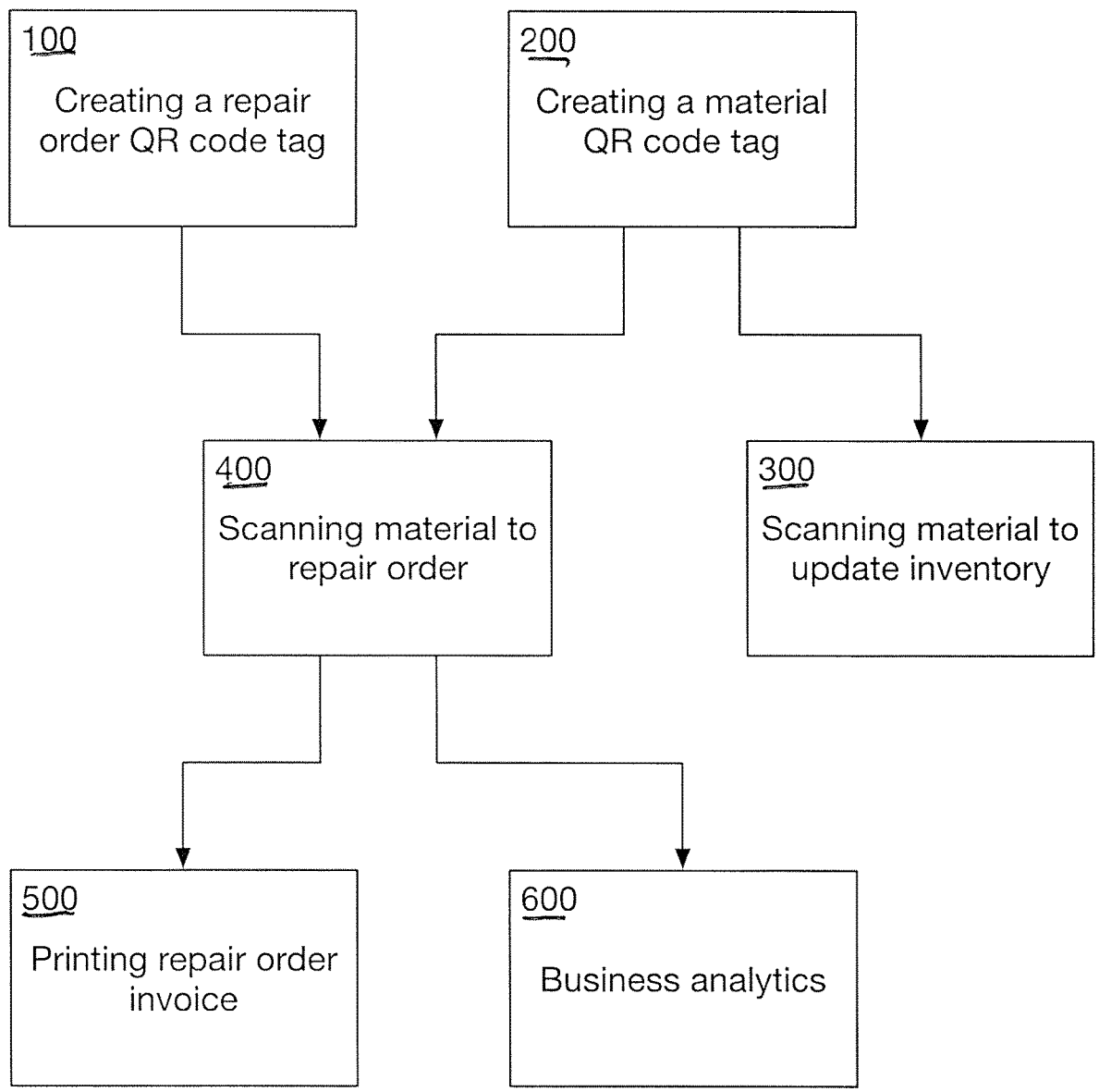
FIG. 1 depicts an overview block diagram of the system, in accordance with an embodiment of the invention.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

The present invention relates to a management system that tracks the usage of materials used in a repair and collates that information into an accurate material invoice for a given repair. This system produces significantly more accurate and detailed invoices while also having a straightforward user interface. More specifically, the system involves scanning materials used in a repair order to generate this invoice. To accomplish this, the system utilizes a computer and software executing on that computer.

A computer is a device having one or more general or special purpose processors, memory, storage, and networking components. These networking components can be either wired or wireless.

In the commercial embodiment, the system operates as a web application, meaning that it is a computer program that uses a web browser to perform a particular function. In some embodiments, the system operates as a smart phone application. In other embodiments, the system works as a combined smart phone application and a web application. In further embodiments, the system works as a computer application. In even further embodiments, the system works as a combined web application, smart phone application, and computer application.

The system operates on a network. The network itself represents the communication pathways between the technicians and the online system. In some embodiments, the network is the Internet. In other embodiments, the network is a Local Area Network (LAN) that is not a part of the Internet.

The web server presents web pages that the technicians utilize to interact with the system. Technicians can utilize any device to access these web pages and provide data to the system. The web server may be a local server or a remote server A Quick Response code ("QR code") is a type of matrix barcode. A barcode is a machine-readable representation of numerals and characters. QR codes normally contain data for a locator, identifier, or tracker that points to a website or application. QR codes consist of black squares arranged in a square grid on a white background, which can be read by an image recognition device such as a smart phone. QR codes are processed using Reed-Solomon error correction until the image can be accurately interpreted by the image recognition device. The required data is then extracted from the patterns present in the QR code image.

In some embodiments of the invention, the system requires two-factor authentication before a technician or business administrator can interact with the system. In different embodiments, the system requires two-factor authentication every time a technician or business administrator scans a different repair order. In other embodiments, the system requires two-factor authentication every time any user, which is anyone who interacts with the system, authenticates with the system. In further embodiments, the system requires two-factor authentication before a business administrator closes out an existing repair order.

FIG. 1 depicts an overview block diagram of the system, in accordance with an embodiment of the invention.

The system creates a repair order QR code tag 100. In some embodiments, the repair order QR code tag are repair order tags or repair order identifiers, which can be, but are not limited to, a barcode, a MaxiCode, or a Data Matrix. In different embodiments, repair order QR code tags are referred to as repair orders.

The system creates a material QR code tag 200. In some embodiments, the material QR code tags are material code tags or material identifiers. In different embodiments, material QR code tags are referred to as materials. In some embodiments, the material identifiers can be, but are not limited to, a barcode, a MaxiCode, or a Data Matrix.

A technician scans material to a repair order 400. In some embodiments, the material is automatically appended to the repair order when it is scanned. In other embodiments, scanning the material to a repair order automatically prompts a technician to input how much of the material was used on the repair order. In different embodiments, the technician is a business administrator. In further embodiments, the technician is any user who interacts with the system. In different embodiments, there can be zero or more technicians, but there must be at least one business administrator. In other embodiments, there can be zero or more business administrators, but there must be at least one technician.

A technician scans material to update inventory 300. In some embodiments, a technician scanning the material to update the inventory is automatically prompted by the system to change other material details within the system. In other embodiments, the available stock of a material is automatically changed when a technician utilizes the material on a repair order. In different embodiments, the available stock of a material can be updated by suppliers within the system. In further embodiments, the system can automatically prompt a technician to update the inventory of a material.

In different embodiments, the technician scanning a material QR code tag to update inventory is a business administrator. In further embodiments, the technician is any user who interacts with the system.

The system prints repair order invoices 500. In different embodiments, the system can automatically generate an invoice once the last material QR code tag has been appended to a repair order for a type of repair. In other embodiments, the system can require a business administrator to print a repair order invoice. In some embodiments, the system can allow any user of the system to print a repair order invoice.

The system automatically generates business analytics 600. In different embodiments, the system does not automatically generate business analytics. In other embodiments, the system automatically makes suggestions regarding operational improvements based on the business analytics.

Figure 2:
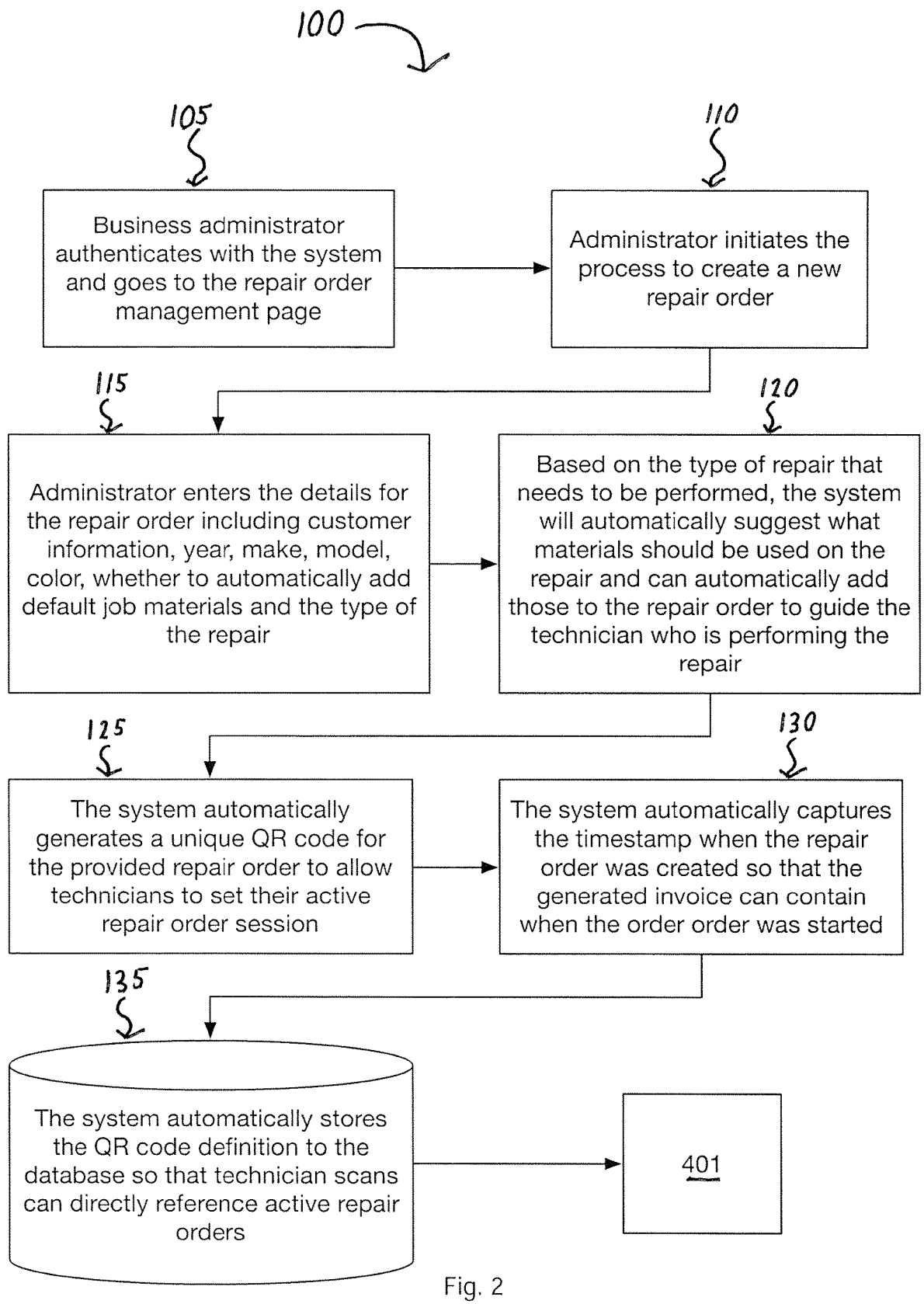
FIG. 2 depicts an embodiment of the system creating a repair order QR code tag shown in FIG. 1.

FIG. 2 depicts a system of generating a repair order QR code tag 100. This system utilizes a computer and software executing on the computer to allow a business administrator to authenticate with the system and go to the repair order management page 105. In the preferred embodiment, this authentication lasts for 30 days, allowing a business administrator to seamlessly engage with the system without having to authenticate themselves repeatedly. In other embodiments, this authentication can last from one hour to 90 days.

In some embodiments, a business administrator is a technician. In other embodiments, the business administrator is any user interacting with the system. In even further embodiments, there is only one business administrator. In different embodiments, there are at least two business administrators.

Administrator initiates the process to create a new repair order 110. In some embodiments, the system can automatically initiate the process to create a new repair order QR code tag. In other embodiments, a new repair order is automatically generated upon a customer inputting their information into the system. Instead of a business administrator having to enter in the general information related to the vehicle, the system will simply generate this based on the customer's information. A business administrator or technician can then review the automatically generated repair order to ensure that the details of the repair order are correct. In different embodiments, the system will retrieve this general information from a $3^{rd}$ party system integration.

Administrator enters the details for the repair order including, but not limited to, the customer information, the year the vehicle was made, the make of the vehicle, the model of the vehicle, the color of the vehicle, whether to automatically add default job materials, the type of repair, and combinations thereof 115. In some embodiments, repair order details are repair order features. In further embodiments, the repair order features are selected for the repair order identifier.

In some embodiments, changing the repair order details of a pre-existing repair order will generate a new repair order QR code tag with a new QR code. In other embodiments, changing the repair order details of a pre-existing repair order will alter the repair order details without affecting the repair order QR code tag.

Based on the type of repair that needs to be performed, the system will automatically suggest what materials should be used on the repair and can automatically add those to the repair order to guide the technician who is performing the repair 120. In different embodiments, the system automatically suggests a list of recommended materials that can be used on a repair, allowing a technician to see the possible options of materials that can be used on a repair. In other embodiments, the system has a plurality of types of repairs. In some embodiments, the system associates a plurality of materials with each type of repair. In different embodiments, a technician, business administrator, or any other user who interacts with can select a type of repair. In some embodiments, when the user selects the type of repair, the system automatically generates materials associated with the type of repair. This eliminates the need for the user to add every single material for a repair based on their own memory and gives them a list of materials that they need to utilize in the repair. In some embodiments, the automatically generated materials associated with the type of repair can be removed by the user. In other embodiments, the automatically generated materials associated with the type of repair cannot be removed by the user. In some embodiments, the suggested material to use for that repair are derived from the year, make, and model of the vehicles as a result of different construction patterns.

The system automatically generates a unique QR code for the provided repair order to allow technicians to set their active repair order session 125.

The system automatically captures the timestamp when the repair order was created so that the generated invoice can contain when the repair order was started 130. In different embodiments, the scanning of a new repair order will create another timestamp for the first repair order so that the start and stop time of a technician working on the repair order can be recorded on the invoice.

The system automatically stores the QR code definition to the database so that technician scans can directly reference active repair orders 135. In other embodiments, the system automatically stores the repair order identifier definition to the database so that the technician scans can directly reference active repair orders. In different embodiments, the system automatically generates a unique repair order identifier for the repair order after the repair order features have been stored. This activates the billable project associated with the repair order QR code tag and allows scans of material QR code tag to be automatically appended to the billable project when the material QR code tag is scanned.

In some embodiments, the repair order can be deleted from the system by a business administrator. In other embodiments, the repair order can be deleted by a technician. In different embodiments, the repair order can be deleted by any user who interacts with the system.

In different embodiments, the system automatically prompts a warning to a business administrator that they are about to delete a repair order.

In some embodiments, deleted repair orders will be automatically removed from the system. In other embodiments, deleted repair orders will remain stored on the system for at least 7 days.

Figure 5:
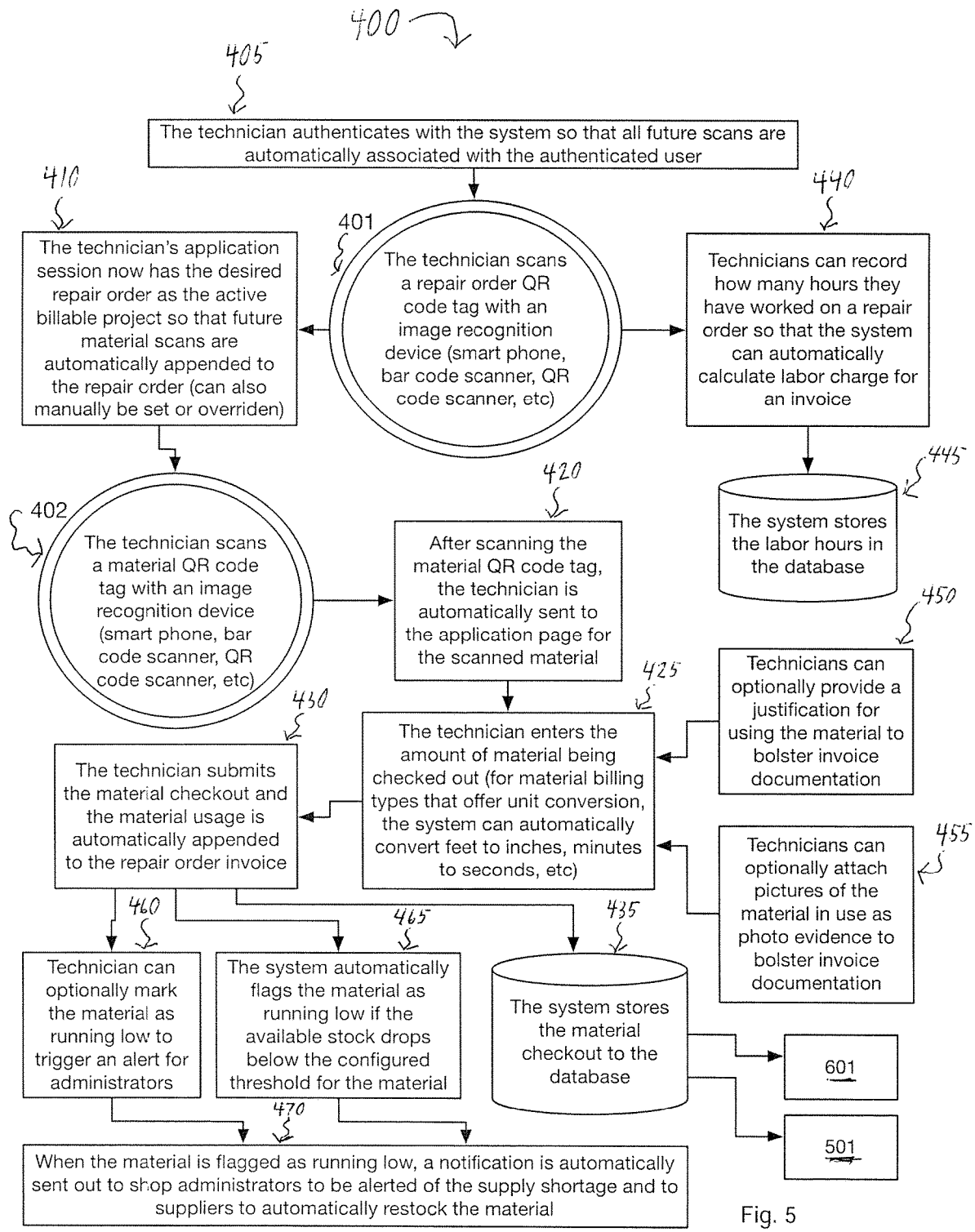
FIG. 5 depicts an embodiment of the system automatically appending a scanned material QR code tag to a repair order shown in FIG. 1.

In FIG. 5, the technician scans the repair order QR code tag with an image recognition device, which can be, but is not limited to, a smart phone, bar code scanner, QR code scanner, personal computer with a webcam connected to it, a desktop computer with a webcam connected to it, a laptop computer with a webcam, a notebook with a webcam, or a kiosk 401.

Multiple technicians can scan material QR code tags into the unique billable project of a repair order simultaneously, allowing for a more seamless workflow environment. In some embodiments, a unique billable project is associated with a repair order identifier. In further embodiments, only one technician can work on a unique billable project associated with the repair order QR code tag. In different embodiments, only technicians selected by a business administrator can work on a billable project associated with the repair order QR code tag.

Figure 3:
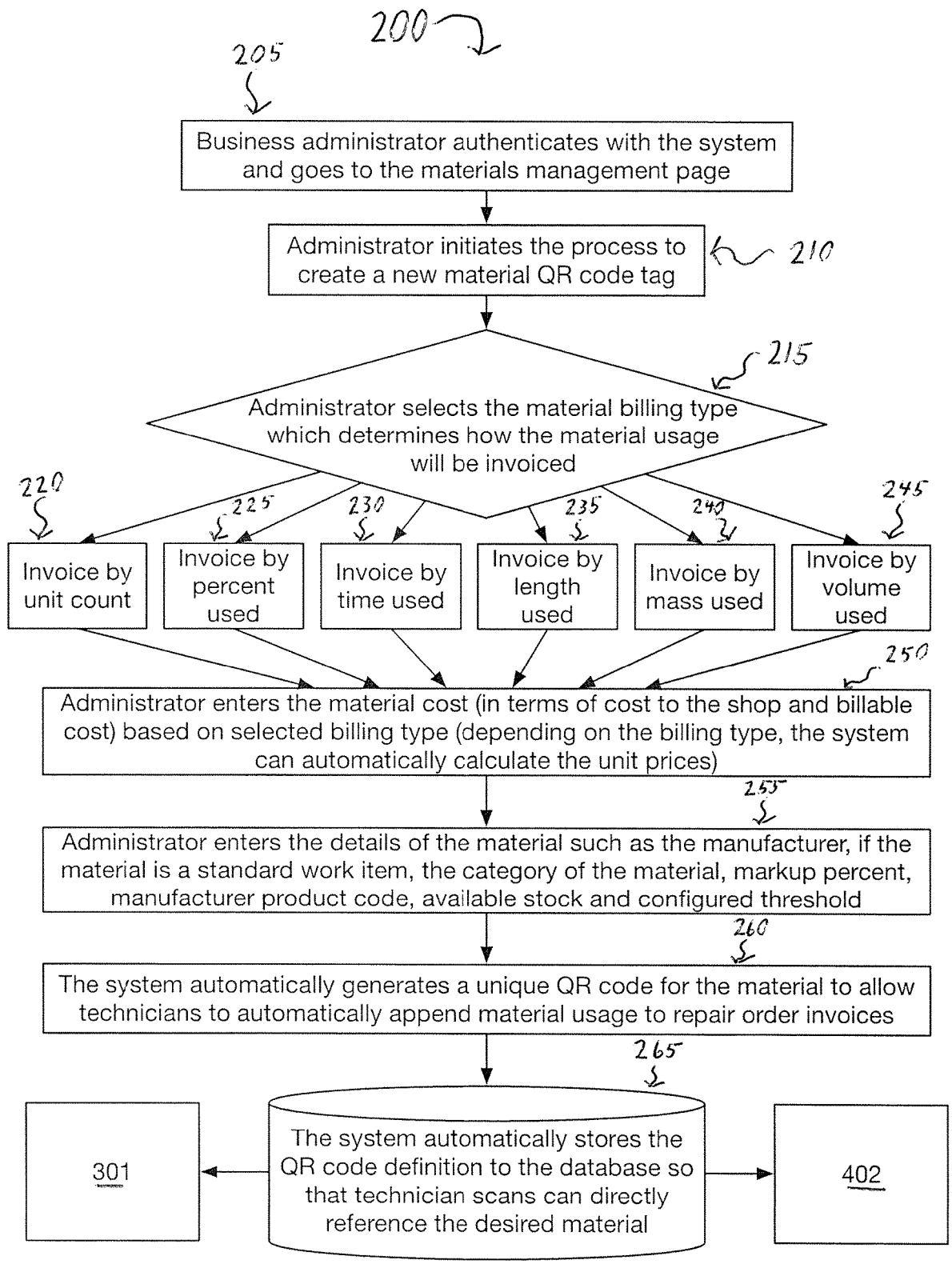
FIG. 3 depicts an embodiment of the system creating a material QR code tag shown in FIG. 1.

FIG. 3 depicts a system of generating a material QR code tag 200. The business administrator authenticates with the system and goes to the materials management page 205. In some embodiments, the business administrator is a technician. In other embodiments, the business administrator is any individual working with the system. In even further embodiments, there is only one business administrator. In different embodiments, there are at least two business administrators.

In the preferred embodiment, this authentication can last for 30 days, allowing the business administrator to seamlessly engage with the system without having to authenticate themselves repeatedly. In other embodiments, this authentication lasts at least 90 days.

The administrator initiates the process to create a new material QR code tag 210. In some embodiments, the material QR code tag is a material identifier, which can be, but is not limited to, a QR code, a bar code, a MaxiCode, or a Data Matrix. In different embodiments, material identifiers and repair order identifiers are referred to collectively as identifiers.

The administrator selects the material billing type which determines how the material usage will be invoiced 215. The material billing types include, but are not limited to, invoice by physical count 220, invoice by percent used 225, invoice by time used 230, invoice by length used 235, invoice by mass used 240, and invoice by volume used 245.

Administrator enters the material cost based on selected billing type 250 (depending on billing type, the system can automatically calculate unit prices). In some embodiments, the system can automatically calculate the unit prices using the material cost and the amount of a material used.

In different embodiments, the technician, business administrator, or any user who interacts with the system enters both a list price of a material and a wholesale price of a material when creating a material QR code tag. This will allow any user who interacts with the system to calculate the realized cost and the invoice cost. By entering both the list price and the wholesale price, any user who interacts with the system can quantify how much they are spending and invoicing on materials.

In some embodiments, the technician, business administrator, or any user who interacts with the system only enters the list price of a material. In other embodiments, the user only enters the wholesale price of a material. In different embodiments, the user does not enter either the list price of a material or the wholesale price of a material. In further embodiments, the list price of a material and the wholesale price of a material will automatically be associated with a material QR code tag. In even further embodiments, the list price of a material and wholesale price of a material can be collected from a database of material costs or a third-party system integration.

Administrator enters the details of the material such as the manufacturer of the material, if the material is a standard work item, the category of the material, the markup percent of the material, the manufacturer product code, the available stock, configured threshold, and combinations thereof 255. In some embodiments, the unit prices may be collected from a database of material costs or a third-party system integration. In different embodiments, material details can include any details that would be considered by a person of ordinary skill in the art.

In some embodiments, any material can be a standard work item. In other embodiments, only certain materials can be a standard work item. In other embodiments, a business administrator selects which materials are a standard work item.

In some embodiments, the configured threshold is automatically compared to the available stock. If the available stock is greater than or equal to the configured threshold, then the material scan tag will not be flagged for restock. If the available stock is less than the configured threshold, then the material scan tag will be flagged for restock.

In some embodiments, the material features that a business administrator can select for a material QR code tag include, but are not limited to, material billing type, material cost, material details, and combinations thereof. In further embodiments, the material features that a business administrator can select for a material identifier include, but are not limited to, material billing type, material cost, and material details, and combinations thereof.

The system automatically generates a unique QR code for the material to allow technicians to automatically append material usage to repair order invoices 260.

The system automatically stores the QR code definition to the database so that technician scans can directly reference the desired material 265. In other embodiments, the system automatically stores the material identifier definition to the database so that the technician scans can directly reference the desired material and the material features. In different embodiments, the system automatically generates a unique material identifier for the material when the material features have been stored.

In some embodiments, repair order features and material features are referred to collectively as features. In different embodiments, a plurality of features can be associated with an identifier. In other embodiments, a technician, business administrator, or any other user who interacts with the system can select features for an identifier. In some embodiments, an identifier is automatically generated with the selected features.

In some embodiments, the material can be deleted from the system by the administrator. In other embodiments, the material can be deleted by a technician. In different embodiments, the repair order can be deleted by any user who interacts with the system.

In different embodiments, the system automatically prompts a warning to a business administrator that they are about to delete a material.

In some embodiments, the system automatically prints out the material QR code tag when the system generates the unique QR code. In other embodiments, the system will notify a technician, a business administrator, or a user who interacts with the system that the material QR code tag has not been printed. In different embodiments, the system will automatically compile all the material QR code tags stored in the database into a document so that all the material QR code tags associated with the auto body repair shop can be bulk printed. In further embodiments, the system can only print material QR code tags individually. In even further embodiments, the system will automatically compile all the material QR code tags selected by a technician into a document so that these selected material QR code tags can be bulk printed. In some embodiments, a technician can be any user who interacts with the system.

In different embodiments, technicians, business administrators, or any user who interacts with the system can create material bundles. Material bundles are groupings of multiple different materials that are used on particular types of repairs. When a material bundle is created, it will automatically generate a unique material bundle QR code tag that can be scanned. Upon scanning this material bundle QR code tag, all the materials associated with the material bundle QR code tag will be appended to the unique billable project of a repair order. For example, one scan of a material bundle may include several abrasives, body filler, primer, blocking paper, etc. This will allow a technician to only have to scan one material bundle QR code tag for a repair order instead of having to scan multiple individual material QR code tags. In some embodiments, the material bundle QR code tags are material bundle code tags or material bundle identifiers. In different embodiments, material bundle QR code tags are referred to as material bundles. In some embodiments, the material bundle identifiers can be, but are not limited to, a barcode, a MaxiCode, or a Data Matrix.

In FIG. 5, the technician scans a material QR code tag with an image recognition device, which can be, but is not limited to, a smart phone, bar code scanner, QR code scanner, personal computer with a webcam connected to it, a desktop computer with a webcam connected to it, a laptop computer with a webcam, a notebook with a webcam, or a kiosk 402.

Figure 4:
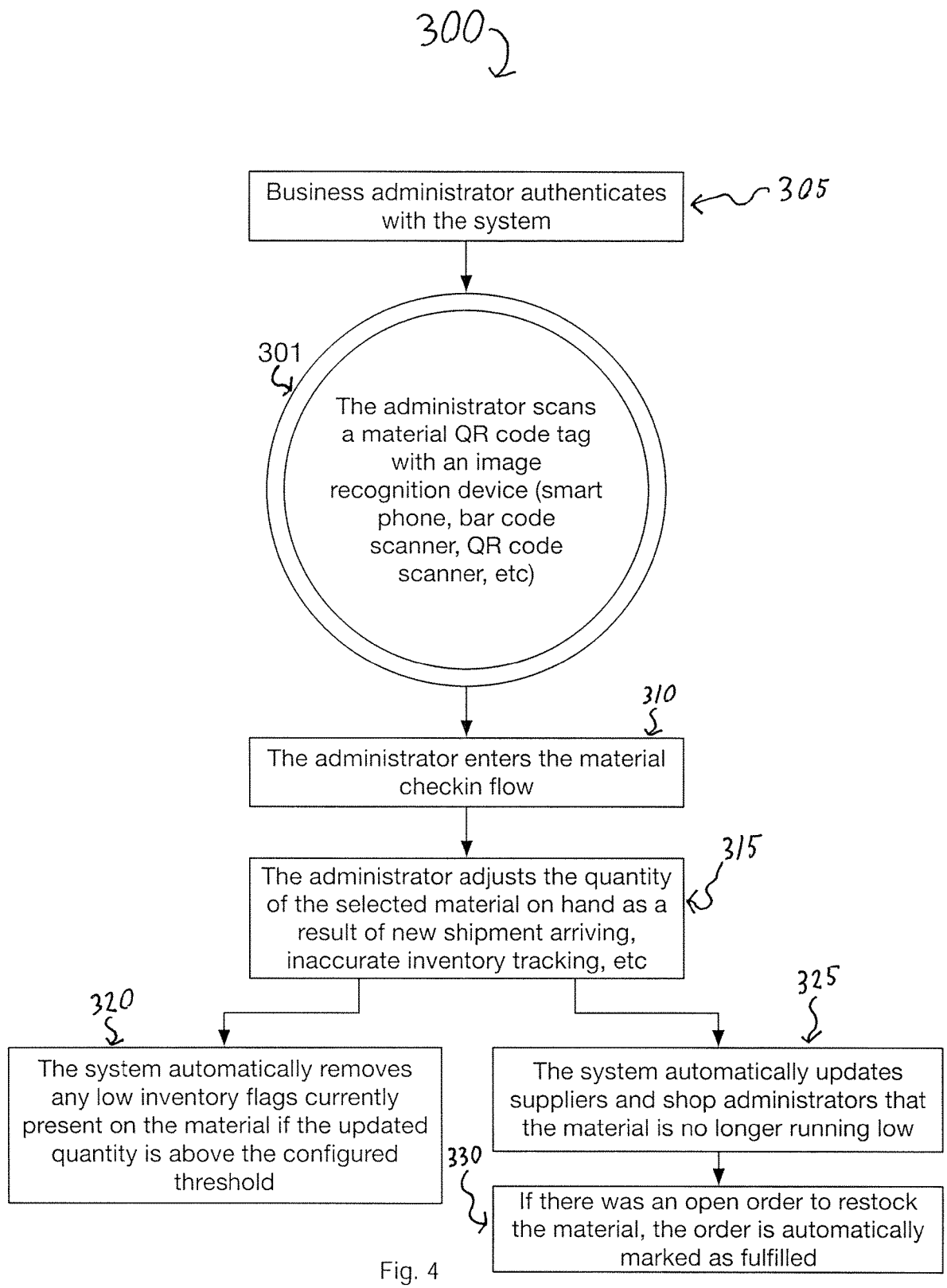
FIG. 4 depicts an embodiment of the system updating the inventory of a material shown in FIG. 1.

In FIG. 4, the business administrator scans a material QR code tag with an image recognition which can be, but is not limited to, a smart phone, bar code scanner, QR code scanner, personal computer with a webcam connected to it, a desktop computer with a webcam connected to it, a laptop computer with a webcam, a notebook with a webcam, or a kiosk 301.

FIG. 4 depicts a system for updating a material QR code tag 300. This system utilizes a computer and software executing on the computer to allow a business administrator to authenticate with the system 305. In the preferred embodiment, this authentication can last for 30 days, allowing a business administrator to seamlessly engage with the system without having to authenticate themselves repeatedly. In other embodiments, this authentication can last from one hour to 90 days.

In some embodiments, a business administrator is a technician. In other embodiments, a business administrator is any user working with the system. In even further embodiments, there is only one business administrator. In different embodiments, there are at least two business administrators.

The administrator scans a material QR code tag with an image recognition which can be, but is not limited to, a smart phone, bar code scanner, QR code scanner, personal computer with a webcam connected to it, a desktop computer with a webcam connected to it, a laptop computer with a webcam, a notebook with a webcam, or a kiosk 301.

The administrator enters the material checkin flow 310.

The administrator adjusts the quantity of the selected material on hand as a result of new shipments arriving or inaccurate inventory tracking, among other events that can cause the quantity of selected material to no longer be correct 315.

The system automatically removes any low inventory flags currently present on the material if the updated quantity is above its configured threshold 320. In other embodiments, the system automatically removes any low inventory flag if the available stock of the material is greater than or equal to the configured threshold.

The system automatically updates suppliers and shop administrators that the material is no longer running low 325. In other embodiments, the system does not automatically update suppliers and shops administrators that the material is no longer running low. In different embodiments, the system can automatically prompt a business administrator with a reminder to contact the suppliers and shop administrators that the material is no longer running low.

If there was an open order to restock the material, the order is automatically marked as fulfilled 330.

FIG. 5 depicts a system of scanning a material to a repair order 400. This system utilizes a computer and software executing on that computer to allow a technician to authenticate themselves with the system so that all future scans are automatically associated with the authenticated user 405.

In the preferred embodiment, this authentication will last for 30 days, allowing a technician to seamlessly engage with the system without having to authenticate themselves repeatedly. In other embodiments, this authentication will last from one hour to 90 days. In some embodiments, the technician can be a business administrator. In different embodiments, the technician can be any user who interacts with the system.

In some embodiments, there is only one technician. In different embodiments, there are at least two technicians. In other embodiments, there can be zero technicians and at least one administrator.

In different embodiments, scanning the repair order identifier automatically initiates the unique billable project associated with the repair order identifier. In some embodiments, the unique billable project can have a plurality of material identifiers appended to it.

The technician scans a repair order QR code tag with an image recognition device, which can be, but is not limited to, a smart phone, bar code scanner, QR code scanner, personal computer with a webcam connected to it, a desktop computer with a webcam connected to it, a laptop computer with a webcam, a notebook with a webcam, or a kiosk 401. In other embodiments, there can be multiple technicians working on the same repair order QR code tag at once.

Technicians can record how many hours they have worked on a repair order so that the system can automatically calculate the labor charge for an invoice 440.

The system stores these labor hours to the database 445. In some embodiments, a technician can manually record the amount of time they work on a repair order. In other embodiments, the time is measured in hours, minutes, and seconds.

In different embodiments, the scanning of the repair order QR code tag automatically starts a timer that ends upon either a technician completing the repair listed on the repair order QR code tag or when a technician scans a new repair order QR code tag. If a technician scans a new repair order QR code tag, then the time interval a technician has already spent on the first repair order QR code tag will be automatically recorded and stored in a database. In other embodiments, the labor hours can automatically be tracked by the system by having the technician start a timer in the application, and only when the timer is terminated, is the labor time added to the selected repair order.

In further embodiments, the scanning of the repair order QR code tag automatically starts a timer that automatically ends and calculates a time interval upon a specified time within in the system. This specified time can be any time chosen by a business administrator, technician, or any user who interacts with the system. In these embodiments, the specified time can be, but is not limited to, lunch time, break time, or closing time. For example, if closing time is at 5:00 P.M. and a technician scans a repair order QR code tag at 4:30 P.M., then the maximum amount of time that can be accrued on the time interval is 30 minutes. If the time reaches 5:00 P.M. and the technician is still working on the repair order, then the timer will automatically end and the accrued time interval will be calculated and stored into a database. This will help keep the total time intervals accrued on a repair order accurate without a technician needing to remember to stop the timer.

In different embodiments, the scanning of the repair order QR code tag automatically starts a timer that automatically ends and calculates a time interval upon not interacting with the repair order QR code tag after a set amount of time has passed. This set amount of time can be any amount of time chosen by a business administrator, technician, or any user who interacts with the system. For example, if the repair order QR code tag has not been interacted with for 15 minutes, then the timer will automatically end and the accrued time interval will be calculated and stored into a database.

In some embodiments, the scanning of the repair order QR code tag automatically starts a timer that automatically ends and calculates a time interval upon a technician inputting the amount of materials used on the last material to be used on a type of repair. This time interval is then stored into a database.

In further embodiments, the scanning of the repair order QR code tag automatically starts a timer that that automatically calculates a time interval upon a technician inputting the amount of materials used on a material with particular material details. For example, if the material is paint and the paint must dry before the technician proceeds with the repair order, then the system will automatically calculate the time interval based on the time the amount of paint is input into the system rather than including the time that the paint would need to dry. This time interval is then stored into a database.

In other embodiments, a technician can remove their association with a repair order QR code tag by scanning a new repair order QR code tag, allowing for increased workflow from one repair order to the next. A technician will be able to add material QR code tags to this new repair order QR code tag. This process of removing a repair order QR code tag by scanning a new repair order QR code tag can be done at the technician's discretion.

In some embodiments, if a technician has scanned a first repair order QR code tag and they desire to switch over to a second repair order QR code tag, they simply have to scan the second repair order QR code tag and all their subsequent material scans will then be appended to the second repair order QR code tag's unique billable project instead of the first. Thus, by scanning a second repair order QR code tag, they automatically initiate the second repair order QR code tag's unique billable project as well as automatically disassociate their subsequent materials scans from being appended to the first repair order QR code tag's unique billable project. In other embodiments, scanning a second repair order identifier automatically initiates a second unique billable project. In further embodiments, the scanning of a second repair order identifier automatically dissociates future scans of material identifiers from the first unique billable project. In some embodiments, when a repair order is closed, material scans can no longer be made against the repair order and any technicians or administrators that have that repair order as their active session will have that repair order automatically cleared from their session and they must select a new repair order.

In different embodiments, a technician can work on one repair order QR code tag at a time. In other embodiments, a technician can work on multiple repair order QR code tags at the same time.

In further embodiments, the system will have a list of all repair orders for a technician to select. Once the repair order is selected by the technician, all the technician's scans of material QR codes will automatically be appended to that repair order's unique billable project, allowing for alternative avenues for changing repair orders outside of scanning a new repair order QR code tag. In different embodiments, a technician can select a different repair order at any time without having to scan the repair order QR code tag.

In some embodiments, the time intervals by different technicians working on a single repair order will be tracked individually on a per technician basis. In other embodiments, the total amount of all time intervals on a single repair order QR code tag by each technician who worked on the repair order will be tracked.

In different embodiments, the total time worked by each technician can be automatically stored into a separate database for payroll purposes. In further embodiments, the total hours worked by each technician can be automatically exported to the payroll management system.

In some embodiments, the plurality of time intervals accrued for a repair order will be appended to the unique billable project associated with that repair order.

In different embodiments, the system has set time interval ranges for different types of repairs. In further embodiments, the system can automatically flag a repair order if the time intervals that a technician takes to complete a type of repair fall outside of the set time interval ranges for that type of repair. A business administrator can then review the flagged repair order to determine whether the time intervals that a technician takes are appropriate or not.

The technician's application session now has the desired repair order as the active billable project so that future material scans are automatically appended to the repair order (can also manually be set or overridden) 410. Each repair order is associated with a unique billable project. In other embodiments, each repair order is associated with at least two active billable projects. In different embodiments, the unique billable project associated with a repair order identifier can have materials appended to it upon scanning their material identifiers.

The technician scans a material QR code tag with an image recognition device 402.

After scanning the material QR code tag, the technician is automatically sent to the application page for the scanned material 420. In some embodiments, scanning the material QR code tag can automatically fill in the amount of material being checked out based on the type of repair. A technician can then review the amount of material being checked out and make changes as needed.

The technician enters the amount of material being checked out (for material billing types that offer unit conversion, the system can automatically convert feet to inches, minutes to seconds, etc.) 425. In some embodiments, the material billing type includes, but is not limited to, the physical count of the material used, the percent of material used, the time that a material is used, the length of a material used, the mass of a material used, and the volume of a material used. In other embodiments, the system can automatically convert all units related to time, mass, length, area, volume. In further embodiments, the system can automatically convert units into the standard industry unit of measurement, such as a drum container, which has a volume equal to 55 US gallons.

The technician can optionally provide a justification for using the material to bolster invoice documentation 450. In this embodiment of the invention, the technician will be able to, among other things, explain why they used a certain amount of a given material. In some embodiments, the system can automatically prompt the technician to write a justification.

In other embodiments, the system has set ranges for the amount of material normally used on a type of repair. The system will automatically prompt a technician to write a justification if the technician used an amount of material that falls outside of the set ranges for the amount of materials normally used on a type of repair. In even further embodiments, the system will automatically alert a business administrator if a technician has used an amount of materials outside the set ranges. This alert will allow the business administrator to immediately view the justification given by the technician and automatically request more of a justification from the technician if the business administrator believes that the justification is insufficient.

In different embodiments, a technician will not have to provide a justification for using the material to bolster invoice documentation.

The technician can optionally attach pictures of the materials in use as photo evidence to bolster invoice documentation 455. Attaching photos adds weight to the strength of the invoice because the images will demonstrate the need for the amount of materials used.

In further embodiments, the system will automatically notify a technician to attach photos based on the total amount of time spent on a repair order QR code tag. The total amount of time spent on a repair order QR code tag will be automatically calculated using the time intervals accrued by each technician while they work on a repair order QR code tag. In some embodiments, the system will automatically notify a business administrator that photos have been attached. This notification will allow the business administrator to immediately view the photos and vet them for clarity, quality, and visibility, among other things. The business administrator will be simultaneously prompted to approve or disapprove of the photos. If the business administrator approves of the photos, they will automatically be appended to the invoice documentation. If the business administrator disapproves of the photos, the system will automatically notify the technician to retake the photos.

The technician submits the material checkout and the material usage is automatically appended to the repair order invoice 430. In some embodiments, the material usage can increase or decrease the total amount of the material that is inventory. The measure of the total amount of a material in inventory is the available stock.

In some embodiments, the available stock can be measured in identical units as the amount of materials used. This includes, but is not limited to, the physical count of the material used, the percent of material used, the time of the material used, the length of a material used, the mass of a material used, and the volume of a material used. For example, if the amount of materials used is measured by physical count, i.e., 50 Steel Flanged Hex Head Screws, then the available stock will also be measured by physical count, i.e., 250 Steel Flanged Hex Head Screws.

Technician can optionally mark material as running low to trigger an alert for administrators 460.

The system automatically flags the material as low if the available stock drops below a configured threshold for the material 465. In some embodiments, the system does not flag the material as low if the available stock drops below a configured threshold for the material. In different embodiments, flagging is performed manually by a business administrator, technician, or any other user who interacts with the system.

When a material is flagged as running low, a notification is automatically sent out to shop administrators to be alerted of the supply shortage and to suppliers to restock the material 470. In some embodiments, the configured threshold can be based on the percent amount of the available stock. In other embodiments, the configured threshold can consider the market availability of the material before flagging the available stock as running low. If there is a surplus of a given material available on the market, then the material will be flagged later because suppliers will more easily be able to restock the material. If there is a deficiency of a given material available on the market, then the material will be flagged earlier because suppliers will have more trouble restocking the material.

When the material QR code tag is appended to the repair order invoice, the system will store the material checkout to the database 435. In some embodiments, there is only one database for the system. In other embodiments, there are at least two databases for the system. In different embodiments, each supplier will have at least one database for the system. In some embodiments, the supplier's database will allow the supplier to view the inventory of materials in an auto body shop and fulfill orders for the auto body shop, among other uses.

In different embodiments, the system automatically associates the material identifier with the repair order identifier in that the material identifier will be appended to the repair order invoice. In further embodiments, the material identifier has a material usage history that automatically updates when the material is used. This will allow a technician, business administrator, or user of the system to see information related to the material identifier such as when the material was used, what repair order was the material used on, and what technician utilized the material.

Figure 6:
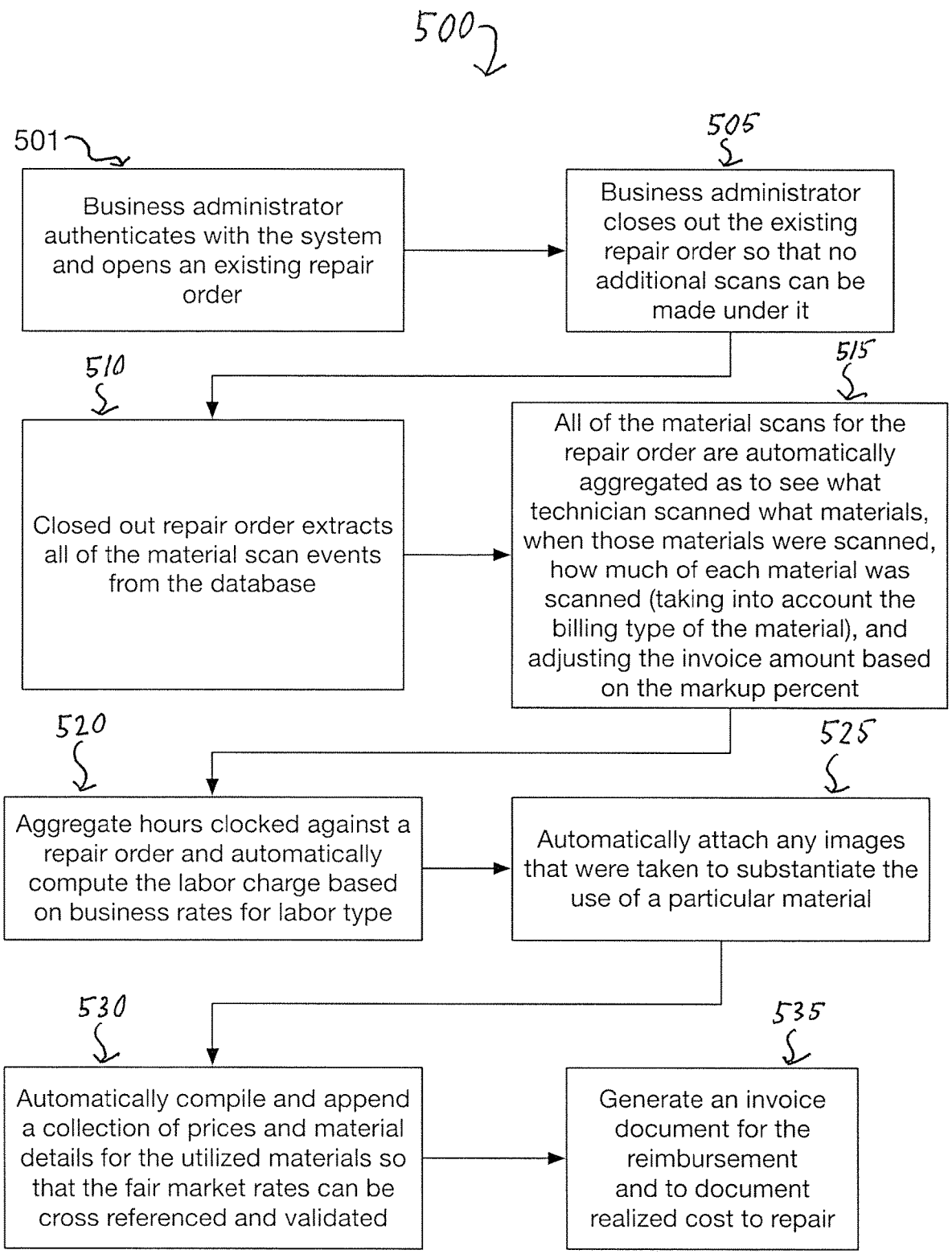
FIG. 6 depicts an embodiment of the system automatically creating a printable invoice for a repair order shown in FIG. 1.

In FIG. 6, the system utilizes a computer and software executing on the computer to allow a business administrator to authenticate with the system and opens an existing repair order 501.

Figure 7:
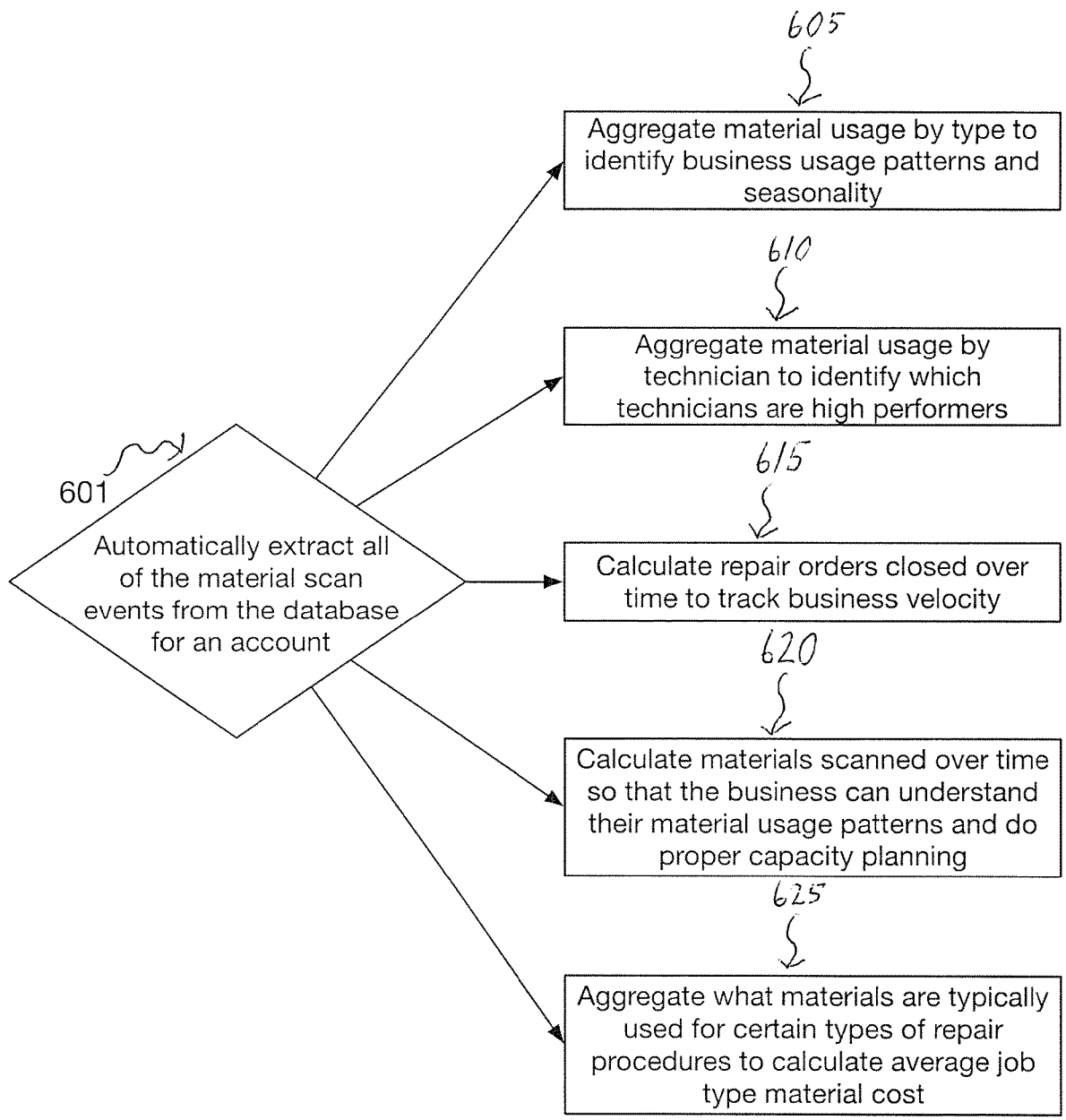
FIG. 7 depicts an embodiment of the system automatically calculating various business analytics shown in FIG. 1.

In FIG. 7, the system utilizes a computer and software executing on that computer that automatically extracts all the data from all of the material scan events from the database for an account 601.

FIG. 6 depicts a system of generating a repair order invoice 500. The system utilizes a computer and software executing on the computer to allow a business administrator to authenticate with the system and opens an existing repair order 501. In some embodiments, the business administrator is a technician. In other embodiments, the business administrator is any user working with the system. In even further embodiments, there is only one business administrator. In different embodiments, there are at least two business administrators.

In the preferred embodiment, the business administrator's authentication can last for 30 days, allowing the business administrator to seamlessly engage with the system without having to authenticate themselves repeatedly. In other embodiments, this authentication can last from one hour to 90 days.

In other embodiments, the existing repair order's invoice will not open unless there are material identifiers associated with it. In different embodiments, the existing repair order's invoice will open when there are no material identifiers associated with it.

The business administrator closes out a repair order so that not additional scans can be made under it 505. In different embodiments, additional scans can be made under the repair order after the business administrator closes out a repair order.

In other embodiments, there must be at least one material QR code tag scanned to a unique billable project that is associated with a repair order QR code tag before it can be closed out. In different embodiments, there must be at least one material identifier scanned to a unique billable project that is associated with a repair order identifier before it can be closed out.

The closed out repair order extracts all of the material scan events from the database 510. In some embodiments, any material QR code tag that has been flagged cannot be extracted from the database. In other embodiments, the system can automatically inform the business administrator that there are flagged material QR code tags extracted from the database. In different embodiments, the system can automatically stop the extraction from occurring until the administrator reviews and removes the flagged material QR code tags. In further embodiments, the system can automatically open each of the flagged QR code tags. This will allow the administrator to see the available stock of flagged QR code tags and give notice to suppliers that certain materials have an available stock below the configured threshold.

In different embodiments, the closed out repair order can be reopened. In other embodiments, the closed out repair order can have the repair order details updated. In some embodiments, the closed out repair order cannot be updated. In other embodiments, a business administrator can reopen the repair order. In further embodiments, any user who interacts with the system, including business administrators and technicians, can reopen the repair order.

In different embodiments, a repair order that is reopened will be automatically flagged by the system. In other embodiments, a repair order that is reopened will not be flagged by the system.

In some embodiments, a closed out repair order can have material scan events removed from the repair order. In further embodiments, a closed out repair order cannot have material scan events removed from the repair order.

All of the material scans for a repair order are automatically aggregated as to see what technician scanned what materials, when those materials were scanned, how much of each material was scanned (taking into account the billing type of the material), and adjusting the invoice amount based on the markup percent 515. In some embodiments, if the same technician is routinely using too little or too much of a material, the system can flag the technician to a business administrator. This will be used for, among other purposes that are obvious to one of ordinary skill in the art, teaching a technician the proper methods of different types of repairs by guiding how much of a particular material they should use on these repairs.

In other embodiments, if certain materials were out of order for a particular type of repair, the system will flag a technician who used the materials out of order. This will be used for, among other purposes that are obvious to one of ordinary skill in the art, teaching a technician the proper methods of different types of repairs by guiding them on when they are supposed to use a particular material.

The system aggregates hours clocked against a repair order and automatically computes the labor charged based on business rates for the labor type 520. In some embodiments, the labor charge rate can be manually determined by a business administrator. In different embodiments, the labor charge rate can be manually determined by a technician or any user who interacts with the system. In other embodiments, the labor charge rate will be based on industry standards. In even further embodiments, the labor charge rate can be based on the type of repair.

The system automatically attaches any images that were taken to substantiate the use of a particular material 525. In some embodiments, a business administrator can select the images to be displayed on the invoice document. In other embodiments, a business administrator cannot select the images to be displayed on the invoice document. In even further embodiments, the system will automatically attach all images associated with the repair order.

The system automatically compiles and appends a collection of prices and material details for the utilized materials so that the fair market rates can be cross referenced and validated 530. In some embodiments, the system does not automatically compile and append a collection of prices and material details for the utilized materials so the fair market rates can be cross referenced and validated.

The system generates an invoice for reimbursement and to document realized cost to repair 535. In different embodiments, the system automatically collates the unique billable project of a repair order into a form. In some embodiments, the system automatically generates an invoice document with the form. In other embodiments, the system will generate this invoice automatically. In different embodiments, the business administrator reviews the invoice before the invoice is generated. In further embodiments, other factors will be taken into consideration such as the expenses of acquiring particular materials for a type of repair.

FIG. 7 depicts a system of generating a repair order invoice 600. This system utilizes a computer and software executing on that computer that automatically extracts all the data from all of the material scan events from the database for an account 601. In different embodiments, the system will automatically extract all the data from selected material scan events from the database for an account. In other embodiments, the system does not automatically extract all the data from all of the material scan events from the database for an account. In some embodiments, the system comprises of a plurality of repair order identifiers. In further embodiments, the system automatically extracts all the data from the plurality of repair order identifiers from the database for an account. In most embodiments, the account will generate a variety of business analytics including, but not limited to, aggregate material usage by type to identify business usage patterns and seasonality, aggregate material usage by technician to identify which technicians are high performers, the repair orders closed over time to track business velocity, and the materials scanned over time so that the business can understand their material usage patterns and do proper capacity planning.

In some embodiments, a business administrator can initiate the system to automatically extract all the data for an account. In other embodiments, a technician can initiate the system to automatically extract all the data for an account. In further embodiments, any user who interacts with the system can initiate the system to automatically extract all the data for an account.

The system aggregates material usage by type to identify business usage patterns and seasonality 605. In other embodiments, the system will automatically send this material usage data to suppliers. In further embodiments, the system will automatically update the material usage data sent to suppliers. In some embodiments, the system does not aggregate material usage by type to identify business usage patterns and seasonality.

The system aggregates material usage by technician to identify which technicians are high performers 610. In different embodiments, the system aggregates material usage by a group of technicians to identify which groups are high performers. This will allow a business administrator to determine the most effective grouping of technicians. In some embodiments, the system does not aggregate material usage by technician to identify which users are high performers.

In other embodiments, the system automatically aggregates other business analytics related to material usage that would be useful to one of ordinary skill in the art.

The system calculates repair orders closed over time to track business velocity 615. In some embodiments, the system does not calculate repair orders closed over time to track business velocity.

The system calculates materials scanned over time so that the business can understand their material usage patterns and do proper capacity planning 620. In further embodiments, the system will automatically send suppliers this information, allowing them to more precisely supply materials. In some embodiments, the system does not make determinations on material usage patterns.

The system aggregates what materials are typically used for certain types of repair procedures to calculate average job type material cost 625. In some embodiments, the system does not aggregate what materials are typically used for certain types of repair procedures to calculate average job type material cost. In other embodiments, the system will factor in current market costs for materials when calculating average job type material cost.

In other embodiments, the system automatically calculates other business analytics that would be useful to one of ordinary skill in the art.

In even further embodiments, the system automatically makes suggestions that provide insight on operational improvements that can be made based on the business analytics. These suggestions can be based on the entire database of all auto body repair shops utilizing the system. This will allow for the operation and management of an auto body repair shop to be optimized and will also create a community of technicians, business administrators, and other users of the system that can share beneficial strategies with each other.

Although specific advantages have been enumerated above, various embodiments may include some, none, or all of the enumerated advantages. Other technical advantages may become readily apparent to one of ordinary skill in the art after review of the following figures and description.

The invention claimed is:

1. A system for scanning materials into a billable form comprising:
   A computer;
   Software executing on said computer for providing a repair order identifier;
   Software executing on said computer for associating said repair order identifier with a unique billable project;
   Software executing on said computer for providing a material identifier;
   Software executing on said computer for scanning at least one said material identifier to said unique billable project;
   Software executing on said computer for automatically associating said material identifier with said repair order identifier;
   Software executing on said computer for automatically calculating a time interval based upon scanning said repair order identifier; and
   Software executing on said computer for automatically calculating a labor cost based on said time interval and associating said labor cost with said unique billable project.

2. A system for scanning materials into a billable form according to claim 1 further comprising:
   Software executed on said computer for automatically collating said unique billable project.

3. A system for scanning materials into a billable form according to claim 2 further comprising:
   Software executed on said computer for automatically generating an invoice document.

4. A system for scanning materials into a billable form according to claim 1 further comprising:
   Software executing on said computer for appending a plurality of said time intervals to said unique billable project.

5. A system for scanning materials into a billable form according to claim 4 further comprising:
   Software executing on said computer for providing time interval ranges and
   Software executing on said computer for automatically flagging said time intervals if said time intervals fall outside of said time interval ranges.

6. A system for scanning materials into a billable form according to claim 1 further comprising:
   Software executing on said computer for providing a plurality of said repair order identifiers.

7. A system for scanning materials into a billable form according to claim 6 further comprising:
   Software executing on said computer for automatically generating business analytics based on said plurality of said repair order identifiers.

8. A system for scanning materials into a billable form according to claim 1, further comprising:
   Providing an image recognition device to scan said repair order identifier and said material identifier.

9. A system for scanning materials into a billable form according to claim 1, further comprising:
   Software executing on said computer for scanning said repair order identifier, automatically initiating said unique billable project that includes a plurality of material identifiers appended to it.

10. A system for scanning materials into a billable form according to claim 1, further comprising:
    Software executing on said computer for scanning a second repair order identifier, automatically initiating a second unique billable project.

11. A system for scanning materials into a billable form according to claim 10, further comprising:
    Software executing on said computer for automatically disassociating future material scans.

12. A system for scanning materials into a billable form comprising:
    A computer;
    Software executing on said computer for providing an identifier;
    Software executing on said computer for associating a plurality of features with said identifier;
    Software executing on said computer for selecting said features for said identifier;
    Software executing on said computer for automatically generating said identifier with said features;
    Software executing on said computer for providing a material billing type, a material usage and a material details for a material identifier; and
    Software executing on said computer for automatically calculating a material cost based on said material billing type, said material usage, and said material details and for associating said material cost with a unique billable project.

13. A system for scanning materials into a billable form according to claim 12, further comprising:
    Software executing on said computer for providing material details selected from the group consisting of:
    The manufacturer of the material;
    The category of the material;

The markup percent of the material;
The manufacturer product code;
The available stock;
The configured threshold;
and combinations thereof.

14. A system for scanning materials into a billable form according to claim 13 further comprising:
Software executing on said computer for automatically flagging said available stock if said available stock is less than said configured threshold.

15. A system for scanning materials into a billable form according to claim 14, further comprising:
Software executed on said computer for automatically removing any flagged said available stock if said flagged said available stock is greater than or equal to said configured threshold.

16. A system for scanning materials into a billable form according to claim 14, further comprising:
Software executed on said computer for automatically updating suppliers if said available stock is lower than said configured threshold.

17. A system for scanning materials into a billable form according to claim 12, further comprising:
Software executing on said computer for providing features for a repair order identifier selected from the group consisting of:
Customer information;
Vehicle's year of manufacture;
Vehicle's make;
Vehicle's model;
Vehicle's color;
The type of repair;
Whether to automatically add default job materials;
and combinations thereof.

18. A system for scanning materials into a billable form comprising:
A computer;
Software executing on said computer for providing a type of repair;
Software executing on said computer for associating at least one material with said type of repair;
Software executing on said computer for selecting said type of repair;
Software executing on said computer for automatically generating said at least one materials associated with said type of repair;
Software executing on said computer for calculating a material cost based on a material billing type, a material usage and said at least one material;
Software executing on said computer for calculating a labor cost based on time spent; and
Software executing on said computer for generating an invoice based on said material cost and said labor cost.

* * * * *